United States Patent Office 3,064,006
Patented Nov. 13, 1962

3,064,006
NOVEL 5-SUBSTITUTED-6-SULFAMYL
PHTHALIMIDES
Frederick C. Novello, Berwyn, Pa., assignor to Merck & Co., Inc., Rahway, N.J., a corporation of New Jersey
No Drawing. Filed Sept. 6, 1960, Ser. No. 53,872
6 Claims. (Cl. 260—326)

This invention relates to novel sulfamyl-substituted phthalimide compounds which carry at least one additional substituent attached to the benzenoid moiety selected from a halogen or a halogen-like radical for example, chlorine, bromine, fluorine, trifluoromethyl, trichloromethyl, and the like, a lower alkyl such as methyl, ethyl, propyl, butyl, amyl, and the like lower alkyl radicals, a lower alkoxy also preferably having from 1 to 5 carbon atoms in the alkyl chain, nitro or an amino radical and which additionally can be either unsubstituted or substituted on the imide nitrogen and if substituted the substituent can be selected from a lower alkyl, cycloalkyl, alkyl-cycloalkyl, unsubstituted or substituted aralkyl wherein the alkyl moiety can be interrupted by a sulfur or oxygen group and the aryl moiety can be substituted with one or more groups selected from halogen, lower alkyl, nitro, alkoxy and the like radicals, or it may be unsubstituted. While in the preferred form of the invention the sulfamyl group is unsubstituted, it too can be substituted by, for example, a lower alkyl group. The novel compounds of this invention are useful because of their diuretic and/or saluretic properties.

The invention also embraces the intermediate sulfamyl-substituted phthalic acid compounds which have at least one substituent attached to the benzene nucleus selected from the group consisting of halogen or halogen-like radicals, for example chlorine, bromine, fluorine, trifluoromethyl, trichloromethyl and the like, lower alkyl radicals, lower alkoxy radicals also having preferably from 1 to 5 carbon atoms in the chain, nitro and amino groups and in which the sulfamyl group is either unsubstituted or is a lower alkyl substituted sulfamyl group. These sulfamylphthalic acid compounds also possess diuretic and/or saluretic properties and are therefore useful therapeutic agents.

The compounds of this invention are prepared from 4,5-dimethylbenzenesulfonamides, which are oxidized to the corresponding phthalic acid. The acid thus obtained is converted to the di-acid chloride which in turn is converted by amidation to the sulfamylphthalimide. If any desired 4,5-dimethylbenzenesulfonamide is unknown, it can be prepared by chlorosulfonating and amidating the properly substituted xylene by known methods.

Oxidation of the 4,5-dimethylbenzenesulfonamide advantageously is effected by heating with any one of a variety of oxidizing agents such as potassium permanganate, potassium dichromate, chromic acid, and the like.

The phthalic acid thus obtained is converted to the di-acid chloride by using any of the conventional chlorinating agents which, for all practical purposes, can be thionyl chloride although sulfuryl chloride, phosphorus pentachloride, phosphorus trichloride, oxalyl chloride and the like can be employed as well.

Amidation can be effected with any of the common agents such as urea, guanidine, ammonia, any primary amine as a substituted or unsubstituted mono-lower-alkylamine, benzylamine or other aralkylamines in which the alkyl chain can be interrupted by a sulfur or oxygen atom, and the aryl radical can be substituted in the manner described above.

The following examples will illustrate in more detail the methods by which the novel compounds of this invention can be prepared. It will be understood, of course, that modifications and variations can be made in the reaction conditions and in the reactants to produce any of the compounds falling within the scope of this invention.

EXAMPLE 1

5-Bromo-6-Sulfamylphthalimide

Step A.—2-bromo - 4,5 - dimethylbenzenesulfonamide (26.4 g.) and magnesium sulfate (62 g.) in 2400 ml. of water is heated to boiling and 88 g. of potassium permanganate is added in portions over a four-hour period. After heating for a total of 8 hours, the solution is cooled. Sodium carbonate (84 g.) is added cautiously and the mixture is filtered to remove manganese dioxide. The filtrate is acidified with dilute hydrochloric acid and concentrated to dryness in vacuo. The residue is extracted with warm ethanol and the extract concentrated to dryness in vacuo. The residue is recrystallized from water to give 55% of 5-bromo-4-sulfamylphthalic acid, M.P. 230–232° C.

Analysis.—Calculated for $C_8H_6BrNO_6S$: C, 29.64; H, 1.87; N, 4.32; Br, 24.66. Found: C, 30.43; H, 2.03; N, 4.32; Br, 24.51.

Step B.—A mixture of 5.0 g. of 5-bromo-4-sulfamylphthalic acid obtained as described above and 40 ml. of thionyl chloride is heated under reflux for two hours and concentrated to dryness in vacuo. The residue is mixed intimately with 1.85 g. of urea and heated at 200° C. for one hour. Upon cooling, the solid is recrystallized from a water-dimethylformamide mixture (2:1) to give 64% of 5-bromo-6-sulfamylphthalimide, M.P. 300° C. dec.

Analysis.—Calculated for $C_8H_5BrN_2O_4S$: C, 31.49; H, 1.65; N, 9.18. Found: C, 31.62; H, 1.74; N, 9.25.

EXAMPLE 2

2-Cyclohexyl-5-Trifluoromethyl-6-Sulfamylphthalimide

Step A.—3-amino-4-carboxybenzotrifluoride and an excess of chlorosulfonic acid are heated together over a steam bath for about three hours. The mixture then is permitted to cool to room temperature and ammonium hydroxide is added to yield 3-amino-4-carbamyl-6-sulfamylbenzotrifluoride. This product then is converted to a diazonium salt and then reacted with cuprous cyanide by the well known Sandmeyer reaction to yield 4 - carbamyl-3-cyano-6-sulfamylbenzotrifluoride. Treatment of this compound with ethanolic hydrogen chloride containing 1 mole of water for 24 hours at room temperature yields 3,4-dicarbethoxy - 6 - sulfamylbenzotrifluoride. This ester can be hydrolyzed to the free acid by heating with 10% sodium hydroxide over the steam bath for about 2 hours thus forming 3,4-dicarboxy-6-sulfamylbenzotrifluoride.

Step B.—The 3,4-dicarboxy-6-sulfamylbenzotrifluoride obtained as described above, is reacted with thionyl chloride and then with cyclohexylamine by substantially the same method described in Example 1, step B, to yield 2-cyclohexyl-5-trifluoromethyl-6-sulfamylphthalimide.

EXAMPLE 3

2-Benzyl-5-Choloro-6-Sulfamylphthalimide

Step A.—4-chloro-1,2-dimethylbenzene is chlorosulfonated by heating with an excess of chlorosulfonic acid over the steam bath for about 1 hour. The reaction mixture then is permitted to cool to room temperature and an excess of ammonium hydroxide added thereto to yield 2-chloro-4,5-dimethylbenzenesulfonamide. This product then is oxidized by substantially the same method described in Example 1, step A, to form 5-chloro-4-sulfamylphthalic acid.

Step B.—The 5-chloro-4-sulfamylphthalic acid obtained as described above then is reacted with thionyl chloride and benzylamine by substantially the same method described in Example 1, step B, to yield 2-benzyl-5-chloro-6-sulfamylphthalimide.

EXAMPLE 4

2-Benzylmercaptoethyl-5-Methoxy-6-Sulfamylphthalimide

Step A.—4-methoxy-1,2-dimethylbenzene is cholorosulfonated and then amidated by substantially the same method described in Example 3, step A, to yield 2-methoxy-4,5-dimethylbenzenesulfonamide which then is oxidized by substantially the same method described in Example 1, step A, to form 5-methoxy-4-sulfamylphthalic acid.

Step B.—The thus obtained 5-methoxy-4-sulfamyl phthalic acid is threated with thionyl chloride and then with benzylmercaptoethylamine (prepared by reducing the oxime of phenylmercaptoacetaldehyde to phenylmercaptoethylamine) by substantially the same method described in Example 1, step B, to yield 2-benzylmercaptoethyl-5-methoxy-6-sulfamylphthalimide.

EXAMPLE 5

2-Butyl-5-Propoxy-6-(N-Methylsulfamyl)Phthalimide

Step A.—4-propoxy-1,2-dimethylbenzene is chlorosulfonated and amidated by substantially the same method described in Example 3, step A, by replacing the ammonium hydroxide employed in Example 3 by a 25% aqueous methylamine thus forming 2-propoxy-4,5-dimethylbenzene(N-methylsulfonamide). This product then is oxidized by substantially the same method as described in Example 1, step A, to yield 5-propoxy-4-(N-methylsulfamyl)phthalic acid.

Step B.—5-propoxy-4-(N-methsulfamyl)phthalic acid obtained as described above is treated with thionyl chloride and then with a 25% aqueous n-butylamine by substantially the same method described in Example 1, step B, to yield 2-butyl-5-propoxy-6-(N-methylsulfamyl)phthalimide.

EXAMPLE 6

5-Nitro-6-Sulfamylphthalimide

Step A.—4-nitro-1,2-dimethylbenzene is cholorosulfonated and then amidated with ammonium hydroxide by substantially the same method described in Example 3, step A, to form 2-nitro-4,5-dimethylbenzenesulfonamide. This product then is oxidized by substantially the same method described in Example 1, step A, to yield 5-nitro-4-sulfamylphthalic acid.

Step B.—The 5-nitro-4-sulfamylphthalic acid obtained as described above is reacted with thionyl chloride and then with ammonia by substantially the same method described in Example 1, step B, to yield 5-nitro-6-sulfamylphthalimide.

EXAMPLE 7

5-Amino-6-Sulfamylphthalimide

The 5-nitro-6-sulfamylphthalimide obtained as described in Example 6 is added to a 50% alcohol-water mixture and then shaken in an atmosphere of hydrogen with platinum oxide catalyst until hydrogen absorption ceases. The catalyst is removed by filtration and the solution concentrated to dryness in vacuo yielding 5-amino-6-sulfamylphthalimide.

EXAMPLE 8

5-Bromo-2-Cyclohexylmethyl-6-Sulfamylphthalimide

By following substantially the same procedure described in Example 1, steps A and B and replacing the urea employed in step B by an equivalent quantity of cyclohexylmethylamine, there is obtained 5-bromo-2-cyclohexylmethyl-6-sulfamylphthalimide.

EXAMPLE 9

5-Bromo-2-(p-Chlorobenzyl)-6-Sulfamylphthalimide

By following substantially the same method described in Example 1, steps A and B, and replacing the urea employed in step B by an equivalent quantity of p-chlorobenzylamine, there is obtained 5-bromo-2-(p-chlorobenzyl)-6-sulfamylphthalimide.

EXAMPLE 10

5-Methyl-6-Sulfamylphthalimide

Step A.—4-acetyl-3-aminotoluene is chlorosulfonated and then amidated by substantially the same method described in Example 3, step A to give 4-acetyl-5-amino-2-sulfamyltoluene. This product then is reacted with cuprous cyanide by the well known Sandmeyer reaction to yield 4-acetyl-5-cyano-2-sulfamyltoluene which when treated with ethanolic hydrogen chloride and and 1 mole of water for about 24 hours is converted to 4-acetyl-5-carbethoxy-2-sulfamyltoluene. Upon treatment of this compound with sodium hypochlorite and subsequently refluxing with excess alkali there is obtained 5-methyl-4-sulfamylphthalic acid.

Step B.—Upon treating the thus obtained 5-methyl-4-sulfamylphthalic acid with thionyl chloride and then urea by substantially the same method described in Example 1, step B there is obtained 5-methyl-6-sulfamylphthalimide.

The compounds of this invention are effective diuretic and/or saluretic compounds. Because of this property they are useful in therapy for the treatment of any condition resulting from an excessively high concentration of sodium in the body such as in the treatment of edematous conditions resulting, for example, from congestive heart failure. As each of the compounds of this invention can be incorporated in a dosage form similar to that described in the following examples or in other dosage forms suitable for oral or parenteral administration for use in therapy, only two examples are included herein to illustrate the preparation of a representative dosage form.

EXAMPLE 11

Dry Filled Capsules Containing 50 mg. of Active Ingredients Per Capsule

Per capsule, mg.
5-bromo-6-sulfamylphthalimide _____ 50
Lactose _____ 225
Capsule size No. 2

The 5-bromo-6-sulfamylphthalimide is reduced to a No. 60 powder. Lactose then is passed through a No. 60 bolting cloth onto the powder, the combined ingredients are mixed for 10 minutes and then filled into No. 2 dry gelatin capsules.

EXAMPLE 12

Dry filled capsule containing 25 mg. of active ingredient per capsule

Per capsule, mg.
5-bromo-4-sulfamylphthalic acid_____ 25
Lactose _____ 250
Capsule size No. 2.

The 5-bromo-4-sulfamylphthalic acid is reduced to a No. 60 powder. Lactose then is passed through a No. 60 bolting cloth onto the powder, the combined ingredients are mixed for 10 minutes and then filled into No. 2 dry gelatin capsules.

While the above examples describe the preparation of certain compounds which are illustrative of the novel compounds of this invention, and a certain specific dosage form suitable for administering the novel compounds, it is to be understood that the invention is not to be limited by these examples or by the specific reaction conditions described for the preparation of the compounds, or by the specific ingredients included in the pharmaceutical preparations but is to be understood to embrace variations and modifications thereof which fall within the scope of the appended claims.

What is claimed is:
1. 6-sulfamylphthalimide having attached to the 5-position of the benzenoid nucleus a substituent selected from the group consisting of halogen, lower alkyl, lower alkoxy, nitro and amino, and wherein there is attached to the imide nitrogen a substituent selected from the group consisting of hydrogen, lower alkyl, cyclohexyl, cyclohexyl-lower alkyl and phenyl-lower alkyl.
2. 5-halo-6-sulfamylphthalimide.
3. 5-bromo-6-sulfamylphthalimide.
4. 5-lower alkoxy-6-sulfamylphthalimide.
5. 5-nitro-6-sulfamylphthalimide.
6. 5-amino-6-sulfamylphthalimide.

References Cited in the file of this patent
UNITED STATES PATENTS

| | | |
|---|---|---|
| 2,273,444 | Koeberle | Feb. 17, 1942 |
| 2,809,194 | Novello | Oct. 8, 1957 |
| 2,886,566 | Novello | May 12, 1959 |